(12) United States Patent
Kawakatsu et al.

(10) Patent No.: US 7,371,179 B2
(45) Date of Patent: May 13, 2008

(54) TRIPOD CONSTANT-VELOCITY UNIVERSAL JOINT

(75) Inventors: Tsutomu Kawakatsu, Mooka (JP); Shinichi Momonoi, Toyama (JP); Hideki Sugado, Toyama (JP)

(73) Assignee: Honda Motor Co., Ltd., Tokyo (JP)

(*) Notice: Subject to any disclaimer, the term of this patent is extended or adjusted under 35 U.S.C. 154(b) by 253 days.

(21) Appl. No.: 11/159,324

(22) Filed: Jun. 23, 2005

(65) Prior Publication Data
US 2006/0293105 A1 Dec. 28, 2006

(51) Int. Cl.
*F16D 3/205* (2006.01)
(52) U.S. Cl. .................. 464/111; 464/132; 464/905; 384/569
(58) Field of Classification Search ........... 464/111, 464/132, 905; 384/569
See application file for complete search history.

(56) References Cited

U.S. PATENT DOCUMENTS

| | | | | |
|---|---|---|---|---|
| 2,244,197 A | * | 6/1941 | Hessler | 384/569 |
| 4,512,673 A | * | 4/1985 | Condon et al. | 384/569 |
| 5,989,124 A | * | 11/1999 | Goto et al. | 464/111 |
| 6,749,516 B2 | * | 6/2004 | Margerie | 464/111 |
| 6,997,617 B2 | * | 2/2006 | Ide et al. | 384/569 X |
| 2004/0141673 A1 | * | 7/2004 | Schaub et al. | 384/569 |

FOREIGN PATENT DOCUMENTS

JP 10-184717 7/1998

* cited by examiner

*Primary Examiner*—Greg Binda
(74) *Attorney, Agent, or Firm*—Arent Fox LLP (57) ABSTRACT

A tripod constant-velocity universal joint has three guide grooves extending axially along an outer cup, trunnions projecting from a spider inserted into the outer cup, and rollers rotatably mounted on the trunnions through rolling elements. The rollers rotate and slide against guide surfaces of the guide grooves. The rolling elements have flat end faces and are assembled into the rollers by a keystone process. The rollers have flanges for preventing dislodgement of the rolling elements from the rollers. If a distance X by which a rolling element moves radially is maximum, the ratio (W/Dn) of the width W of contact between inner side surfaces of the flanges to the diameter Dn of the rolling element is in a range of from 0% to 30%, and the height h of the flanges also is set to satisfy the ratio value (W/Dn).

6 Claims, 12 Drawing Sheets

$\delta$ : CIRCUMFERENTIAL GAP
X : DISTANCE BY WHICH ROLLING ELEMENT MOVES RADIALLY

| W/Dn [%] | 0 | 5 | 10 | 15 | 20 | 25 | 30 | 35 | 40 | 45 | 50 | 55 |
|---|---|---|---|---|---|---|---|---|---|---|---|---|
| MACHINABILITY | ○ | ○ | ○ | ○ | ○ | ○ | ○ | △ | △ | △ | △ | △ |
| DURABILITY | ○ | ○ | ○ | ○ | ○ | ○ | ○ | ○ | ○ | ○ | ○ | ○ |
| RESISTANCE TO ROTATION | ○ | ○ | ○ | ○ | ○ | ○ | ○ | △ | △ | △ | △ | △ |

PRIOR ART

TRIPOD CONSTANT-VELOCITY UNIVERSAL JOINT

BACKGROUND OF THE INVENTION

1. Field of the Invention

The present invention relates to a tripod constant-velocity universal joint for use in automobiles, industrial machines, etc.

2. Description of the Related Art

Figure 10:
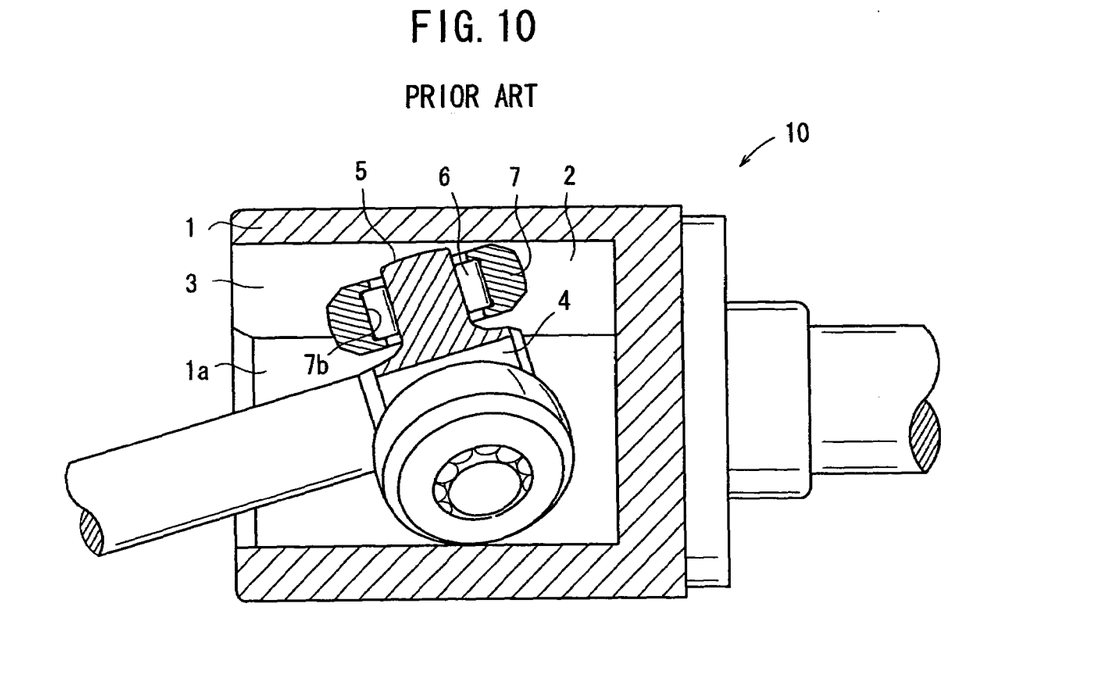
FIG. 10 is a longitudinal cross-sectional view of a conventional tripod constant-velocity universal joint.
Figure 11:
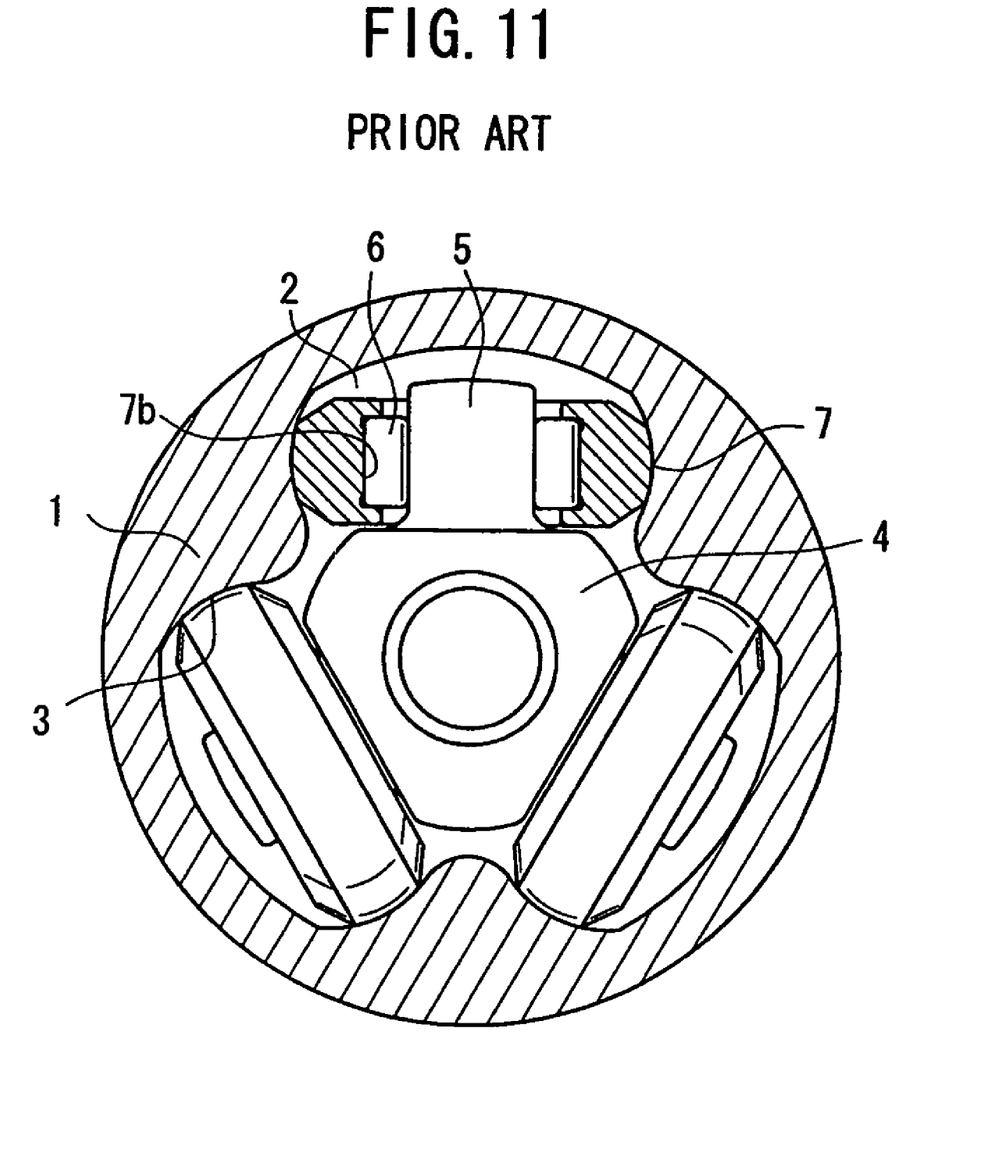
FIG. 11 is a transverse cross-sectional view of the conventional tripod constant-velocity universal joint.

FIGS. 10 and 11 of the accompanying drawings show one known tripod universal joint for transmitting rotational power from a drive shaft to a driven shaft at a constant velocity regardless of the angle (operating angle) between the drive shaft and the driven shaft. As shown in FIGS. 10 and 11, the tripod universal joint includes an outer housing 1 having three track grooves 2 defined in an inner circumferential surface 1a thereof and extending in the axial direction of the outer housing 1. The tripod universal joint also includes a tripod spider 4 inserted in the outer housing 1 and having three leg shafts 5 projecting radially outwardly. Three rollers 7 are rotatably mounted respectively on the leg shafts 5 by needle bearing rollers 6 having round end faces, and are rotatably and slidably held against roller guide surfaces 3 of the track grooves 2. Rotational drive power is transmitted between the tripod spider 4 and the outer housing 1.

Figure 12:
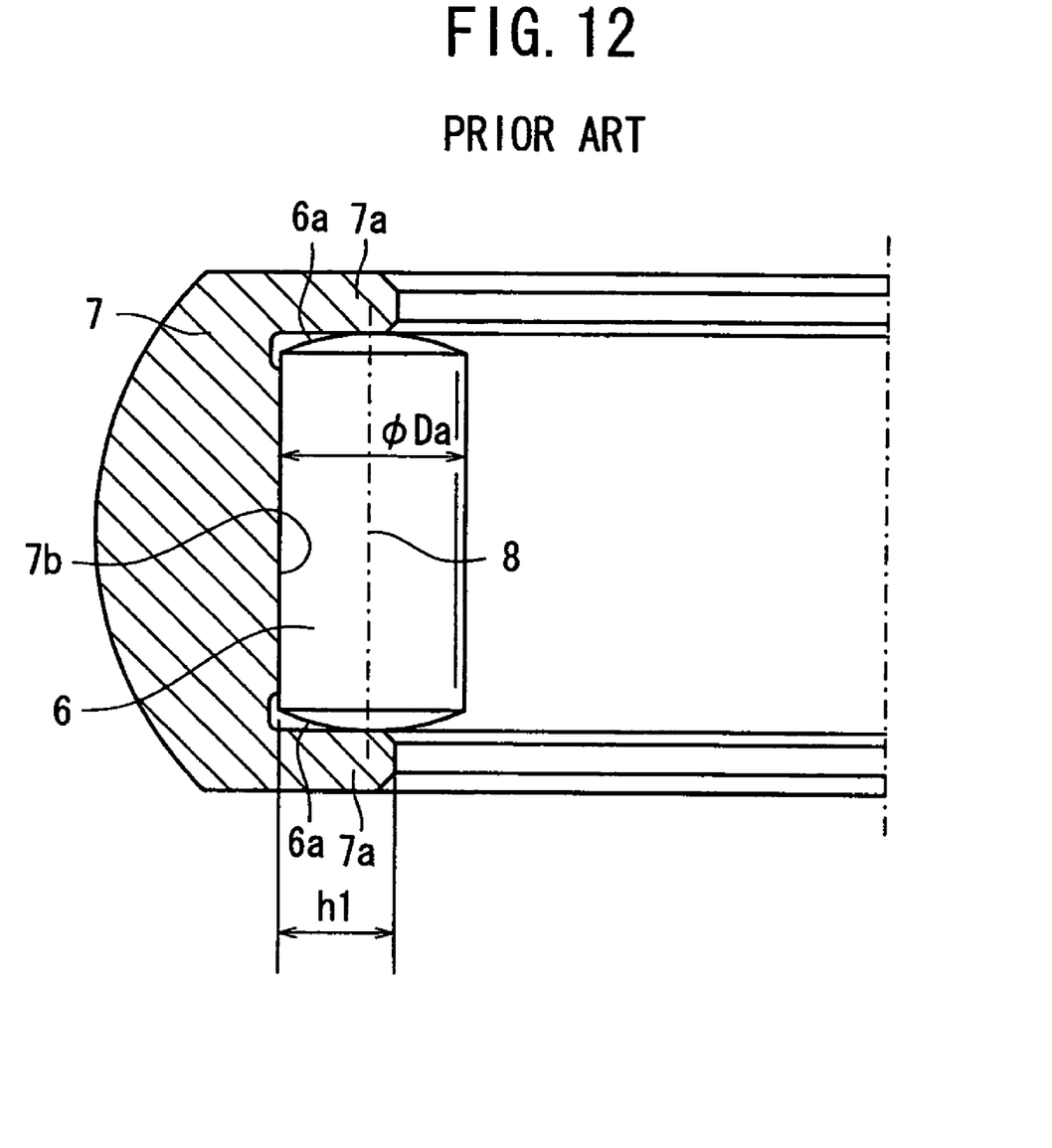
FIG. 12 is an enlarged fragmentary cross-sectional view of a roller mounted on a leg shaft by a needle bearing, in the conventional tripod constant-velocity universal joint shown in FIGS. 10 and 11.

FIG. 12 of the accompanying drawings is a fragmentary cross-sectional view of one of the rollers 7 mounted on the leg shafts 5 by the needle bearings 6. As shown in FIG. 12, the roller 7 has two axially spaced flanges 7a projecting radially inwardly from respective axially spaced ends thereof. The needle bearing rollers 6, which are assembled against an inner circumferential surface 7b of the roller 7 by a keystone process, are prevented from becoming dislodged in the axial direction of the leg shaft 5 by the flanges 7a. For details, reference should be made to Japanese Laid-Open Patent Publication No. 10-184717, for example.

Generally, each of the needle bearing rollers 6 has opposite round end faces 6a. Therefore, the height h1 of the flanges 7a, which is required to prevent the needle bearing roller 6 from becoming dislodged, needs to be greater than one half of the diameter Da of the needle bearing roller 6, i.e., the height h1 needs to go beyond an axial central position 8 of the needle bearing roller 6. Therefore, as the diameter Da of the needle bearing roller 6 becomes larger, the height h1 necessarily becomes larger, resulting in a reduction in the rigidity of the flanges 7a. As the height h1 becomes larger, the service life of the cutting tool that is used to machine the flanges 7a is shortened, and greater difficulty is experienced in assembling the needle bearing roller 6 against the inner circumferential surface 7b of the roller 7.

Japanese Laid-Open Patent Publication No. 10-184717 discloses certain views showing flat end faces of needle bearing rollers. However, there is nothing specifically disclosed or suggested with respect to the dimensions and shapes of the ends of such needle bearing rollers.

SUMMARY OF THE INVENTION

It is a general object of the present invention to provide a tripod constant-velocity universal joint, which includes rollers having flanges and needle bearings having rolling elements that are retained in place by the flanges, wherein the flanges are not required to be increased in height, even when the rolling elements have increased diameters.

A major object of the present invention is to provide a tripod constant-velocity universal joint, which includes rollers having flanges and needle bearings having rolling elements that are retained in place by the flanges, wherein the flanges are not required to be increased in height, and wherein the flanges are easily machinable and the rolling elements are easily assembled, even when the rolling elements have increased diameters.

The above and other objects, features, and advantages of the present invention will become more apparent from the following descriptions when taken in conjunction with the accompanying drawings in which a preferred embodiment of the present invention is shown by way of illustrative example.

DESCRIPTION OF THE PREFERRED EMBODIMENT

Figure 1:
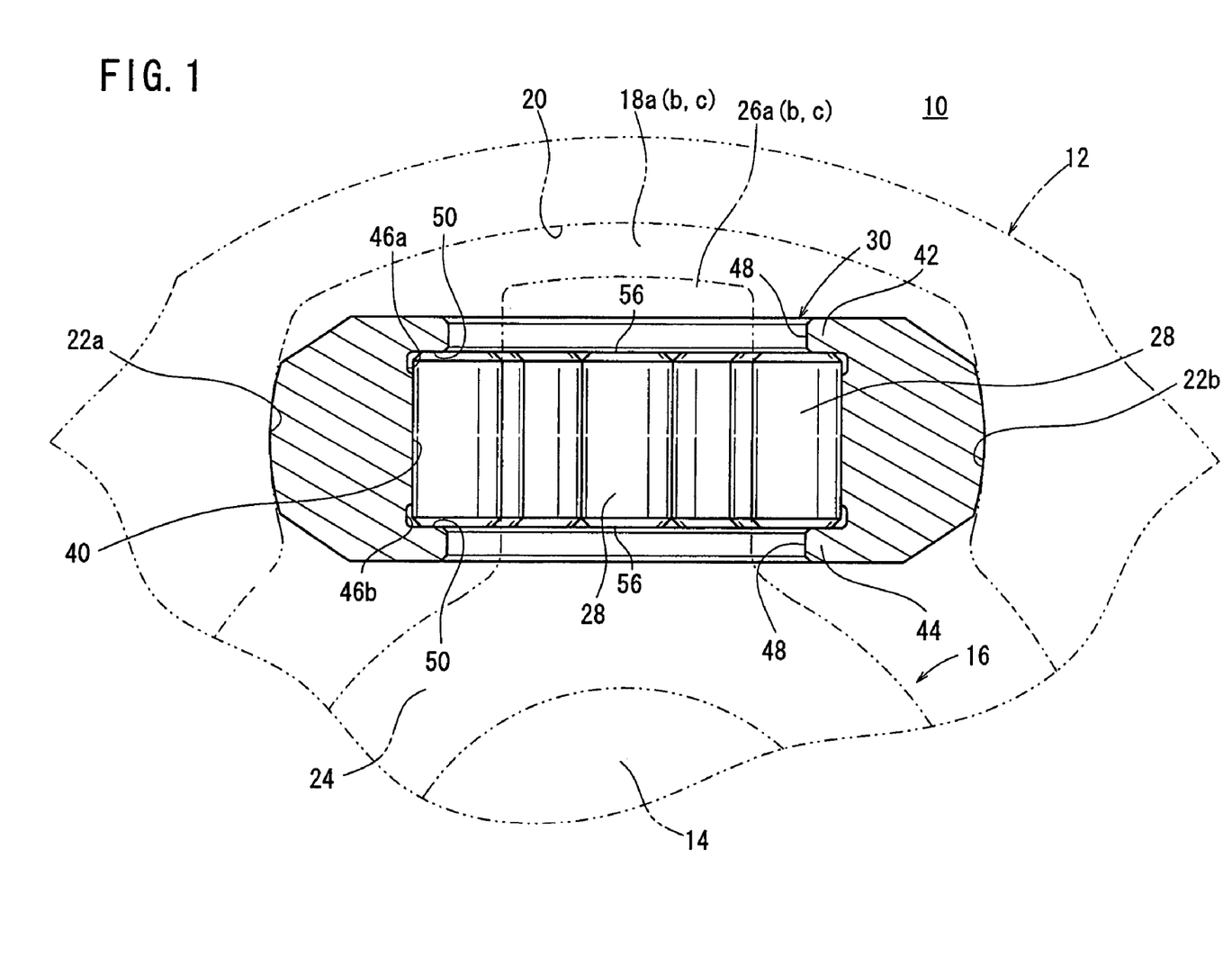
FIG. 1 is an enlarged fragmentary cross-sectional view of a tripod constant-velocity universal joint according to an embodiment of the present invention, the view being taken along a plane perpendicular to the axis of the tripod constant-velocity universal joint.

FIG. 1 shows a tripod constant-velocity universal joint 10 according to an embodiment of the present invention. As shown in FIG. 1, the tripod constant-velocity universal joint 10 basically comprises a tubular outer cup (outer housing) 12 integrally coupled to an end of a first shaft (not shown) and having an opening, and an inner member 16 fixed to an end of a second shaft 14 and housed in the opening of the outer cup 12.

As shown in FIG. 1, the outer cup 12 has three guide grooves 18a through 18c defined in an inner wall surface thereof. The guide grooves 18b, 18c are omitted from illustration in FIG. 1. The guide grooves 18a through 18c extend in the axial direction of the outer cup 12 and are angularly spaced at angular intervals of 120° around the axis of the outer cup 12. Each of the guide grooves 18a through 18c comprises a ceiling 20 having an arcuate cross section and two sliding surfaces 22a, 22b disposed on respective opposite sides of the ceiling 20 in confronting relation to each other, and each having an arcuate cross section.

The inner member 16 comprises a ring-shaped spider 24 fitted over the second shaft 14. The spider 24 has three integral trunnions 26a through 26c projecting radially outwardly from an outer circumferential surface thereof into the respective guide grooves 18a through 18c and angularly spaced at angular intervals of 120° around the axis of the spider 24. The trunnions 26b, 26c are omitted from illustration in FIG. 1.

A ring-shaped roller 30 is fitted over each of the trunnions 26a through 26c, with a plurality of rolling elements 28 interposed therebetween forming a ring-shaped bearing. The rolling elements 28 may comprise roll bearing elements such as needles, rolls, or the like.

Figure 2:
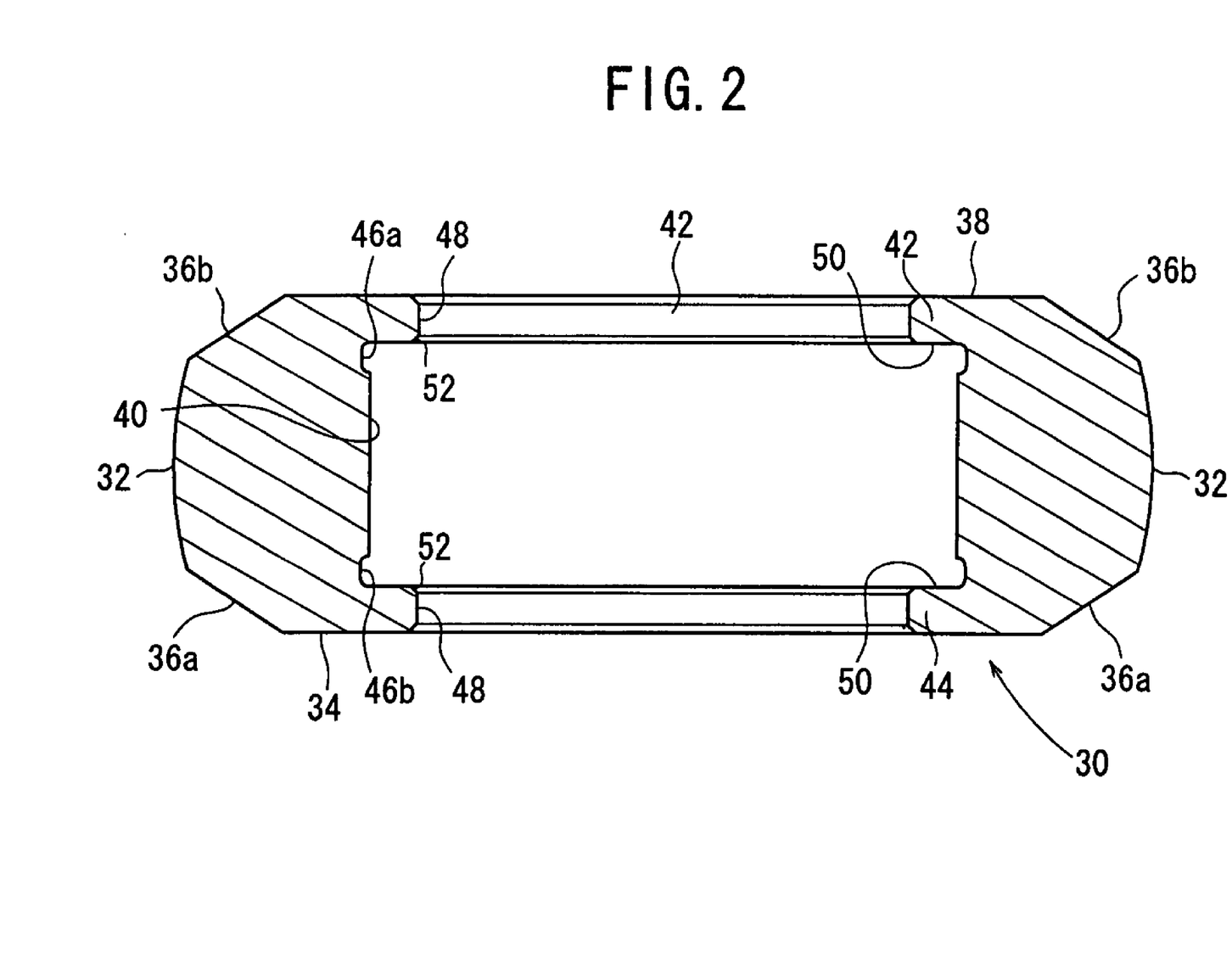
FIG. 2 is a diametrical cross-sectional view of a roller of the tripod constant-velocity universal joint.

As shown in FIG. 2, the roller 30 has an outer circumferential surface comprising an arcuate surface 32, which is complementary in cross-sectional shape to the sliding surfaces 22a, 22b for making face-to-face contact with the sliding surfaces 22a, 22b, a first annular slanted surface 36a extending from the arcuate surface 32 into a first end face 34 of the roller 30, and a second annular slanted surface 36b extending from the arcuate surface 32 into a second end face 38 of the roller 30 which is axially opposite to the first end face 34.

The roller 30 has an inner circumferential wall surface 40 having a constant diameter and functioning as a rolling surface with which the rolling elements 28 are held in rolling engagement. The roller 30 also has an annular first flange 42 integrally projecting radially inwardly a predetermined distance from an upper portion (an end) of the inner circumferential wall surface 40, and an annular second flange 44 integrally projecting radially inwardly a predetermined distance from a lower portion (another end) of the inner circumferential wall surface 40, and which is axially opposite to and spaced from the first flange 42. The rolling elements 28 are mounted on the inner circumferential wall surface 40 of the roller 30 and vertically held in position between the first flange 42 and the second flange 44.

In FIGS. 1 and 2, the first flange 42 and the second flange 44 are shown as being integrally formed with the roller 30. However, the rolling elements 28 may be vertically held in position on the inner circumferential wall surface 40 by holder mechanisms such as washers, circlips, or the like (not shown), mounted in annular grooves (not shown) defined in the inner circumferential wall surface 40. One holder mechanism may be positioned in one of upper and lower positions on the inner circumferential wall surface 40, or two holder mechanisms may be positioned in respective upper and lower positions on the inner circumferential wall surface 40.

As shown in FIG. 2, annular grooves 46a, 46b are defined at boundaries between the inner circumferential wall surface 40 and the first and second flanges 42, 44. The annular grooves 46a, 46b function as lubricant reservoirs for holding a lubricant, such as grease or the like, when the inner circumferential wall surface 40 is coated with the lubricant.

The first and second flanges 42, 44 have inner circumferential surfaces 48 on radially inner distal ends thereof, and also have inner side surfaces 50 serving as inner wall surfaces, for contact with the end faces of the rolling elements 28. The first and second flanges 42, 44 also have beveled edges 52 defined between the inner circumferential surfaces 48 and the inner side surfaces 50.

The rolling elements 28, since they are assembled by a keystone process, are disposed on the inner circumferential wall surface 40 substantially parallel to each other, in a circumferential direction of the roller 30. The rolling elements 28 are retained, while being prevented from dislodgment from the inner circumferential wall surface 40, by the first and second flanges 42, 44, which project radially inwardly from axially opposite ends of the inner circumferential wall surface 40.

Figure 3:
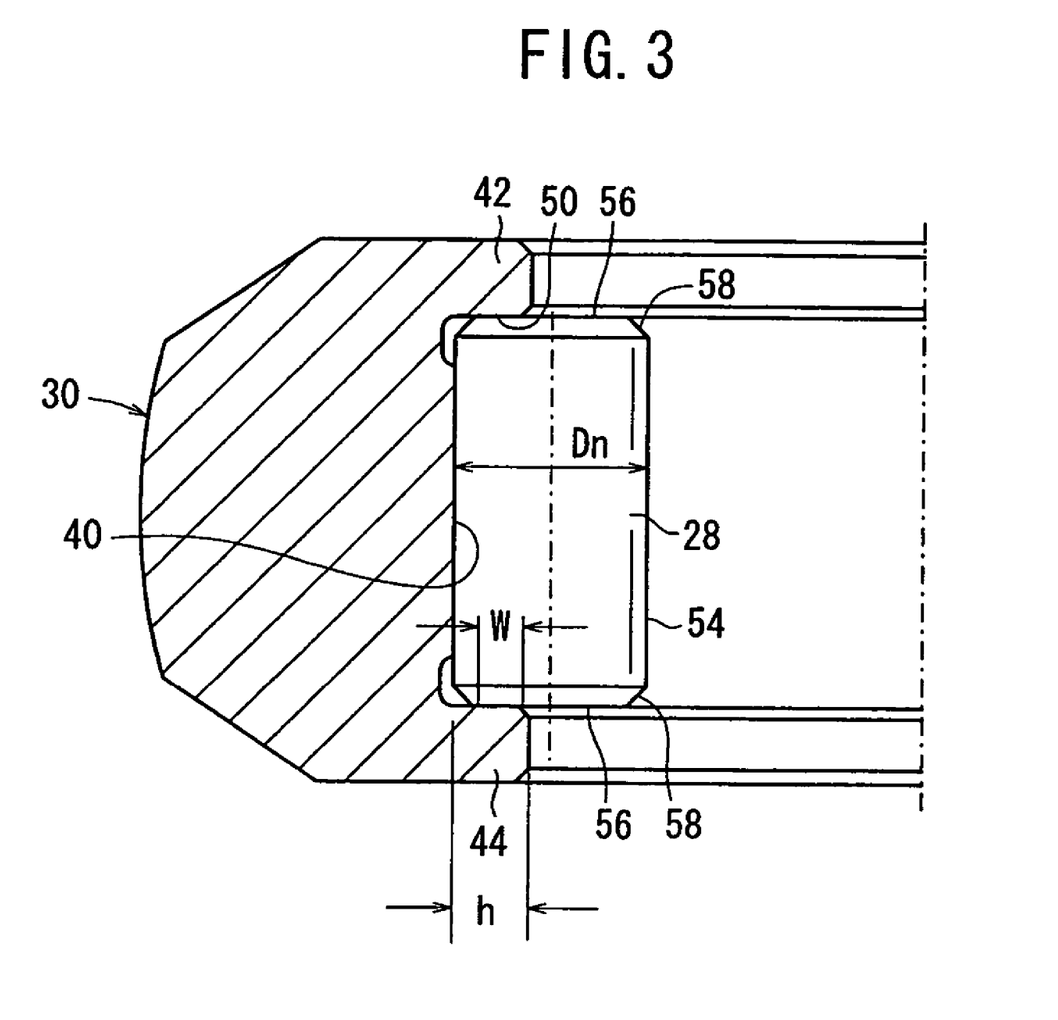
FIG. 3 is an enlarged fragmentary cross-sectional view of the roller shown in FIG. 2.

As shown in FIG. 3, each of the rolling elements 28 comprises a cylindrical body having an outer circumferential cylindrical surface 54 and a pair of flat surfaces 56 on axially opposite ends thereof, with beveled edges 58 defined between the outer circumferential cylindrical surface 54 and the flat surfaces 56. The flat surfaces 56 on axially opposite ends of the rolling elements 28 provide face-to-face contact between the end faces of the rolling elements 28 and the inner side surfaces 50 of the roller 30, thus reducing any surface pressure acting on the end faces of the rolling elements 28 and the inner side surfaces 50 of the roller 30.

The rolling elements 28, which are loaded along the inner circumferential wall surface 40 of the roller 30, have the same diameter and the same shape. Further, the trunnion 26a (26b, 26c) is in the form of a cylindrical body having a constant outside diameter.

The tripod constant-velocity universal joint 10 according to the embodiment of the present invention is basically constructed as described above. Operation and advantages of the tripod constant-velocity universal joint 10 shall be described below.

Figure 4:
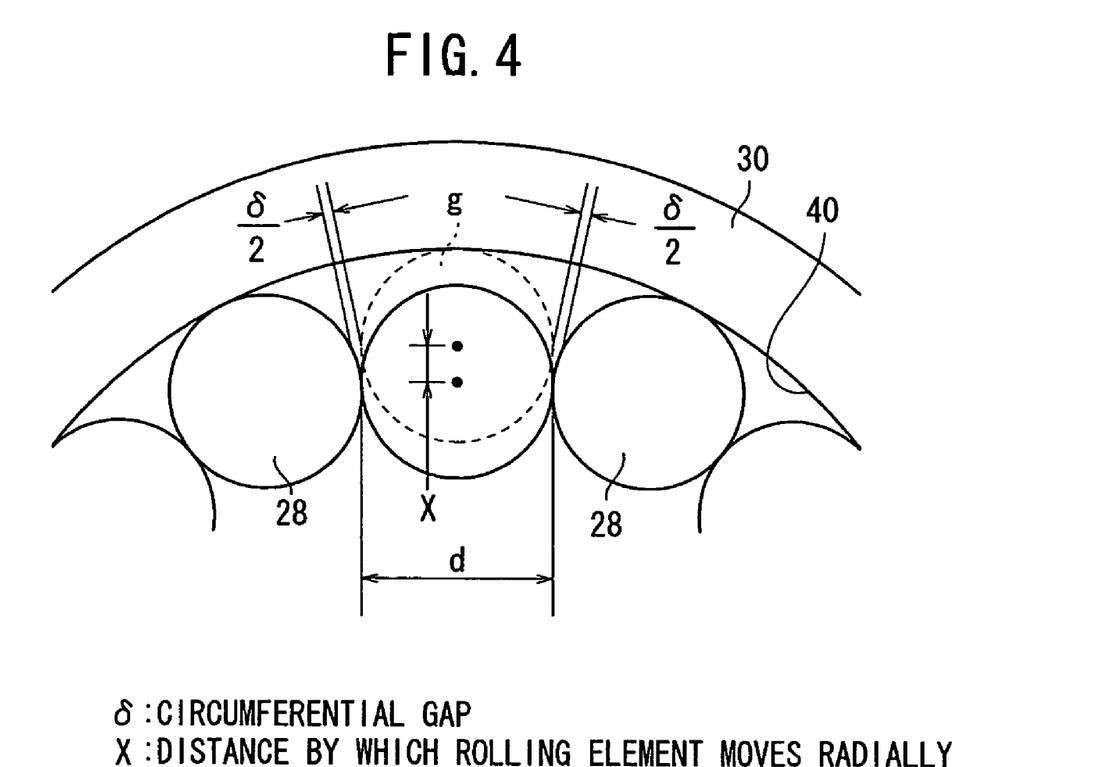
FIG. 4 is a fragmentary cross-sectional view showing a distance, as viewed axially, by which a rolling element, assembled by a keystone process according to the embodiment of the present invention, moves radially.

The keystone process, referred to above, for assembling the rolling elements 28 into the roller 30, is a process of arraying the rolling elements 28 along an inner circumferential wall surface 40 of the roller 30. According to the keystone process, a plurality of rolling elements 28, made up of one rolling element less than the total number of rolling elements 28, are placed in a gap-free array onto the inner circumferential wall surface 40, as shown in FIG. 4. Then, a final rolling element 28 is pressed into a gap g, which exists between two of the rolling elements 28 on opposite ends of the array of rolling elements 28 arranged along the inner circumferential wall surface 40.

The final rolling element 28 has a diameter Dn that is several to several tens μm greater than the distance d by which the above two rolling elements 28 are spaced from each other across the gap g. Therefore, when the final rolling element 28 is pressed into the gap g, all of the rolling elements 28 are neatly arrayed on the inner circumferential wall surface 40 and tentatively held in position by mutual interfering engagement, and thus are prevented from radially inward displacement toward the center of the roller 30.

Figure 6:
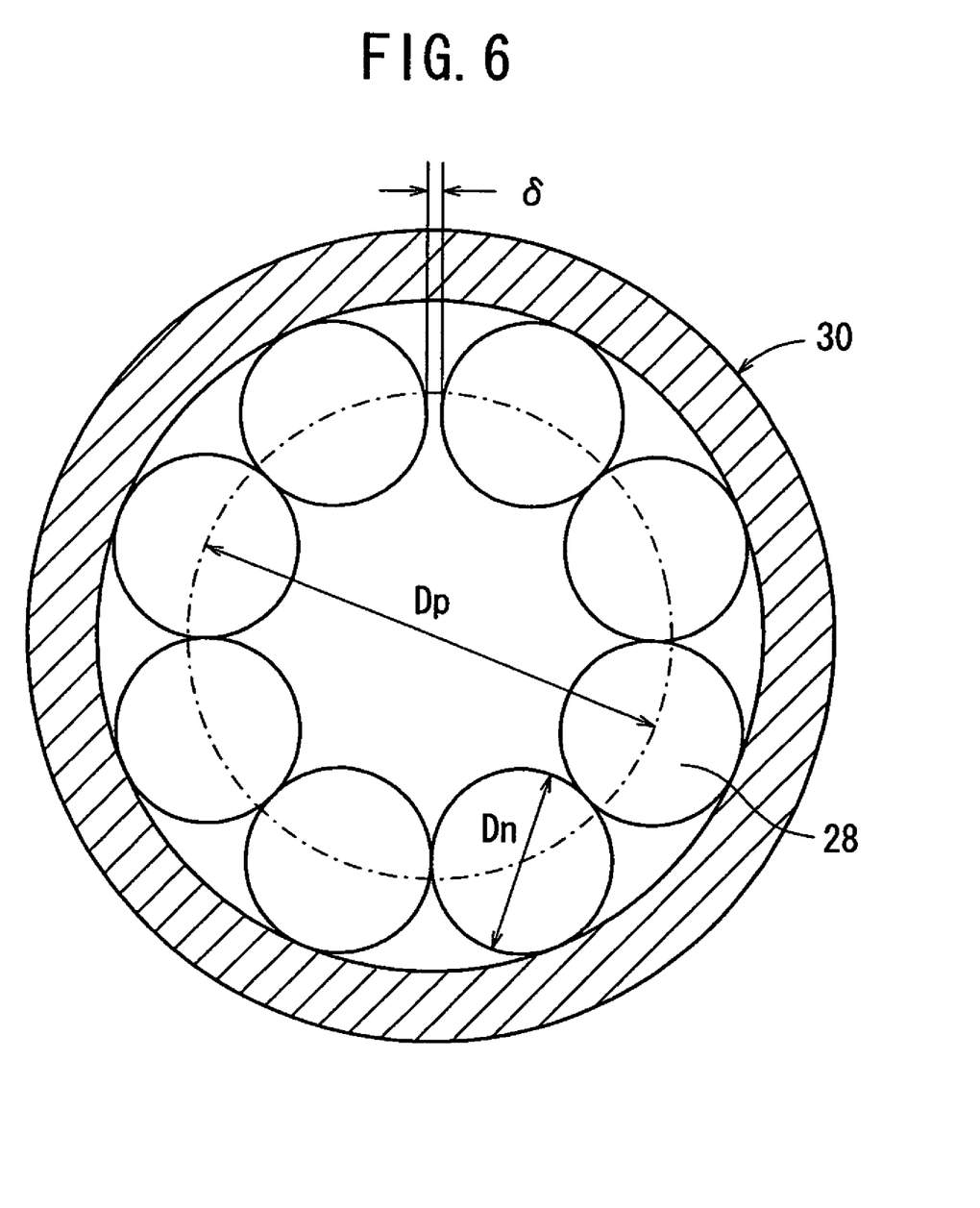
FIG. 6 is a cross-sectional view, which is illustrative of a circumferential gap δ between adjacent rolling elements.

While the rolling elements 28 are tentatively held against the inner circumferential wall surface 40 by the keystone process, except for one rolling element 28, all of the other rolling elements 28 are held in contact with the inner circumferential wall surface 40, with only the one exceptional rolling element 28 being movable radially. The one exceptional rolling element 28 is movable radially by a distance X (see FIG. 4) because of a circumferential gap δ between adjacent rolling elements 28 (see FIG. 6). However, the one exceptional rolling element 28 does not move or fall out of the array of the rolling elements 28 toward the center of the roller 30.

The circumferential gap δ is expressed according to the following equation (1).

$$\delta = Dp \cdot \sin\{(Z-1)\sin^{-1}(Dn/Dp)\} - Dn \quad (1)$$

wherein

δ is the gap between two final rolling elements inserted when all of the rolling elements 28 are arranged as a gap-free array along the inner circumferential wall surface 40 of the roller 30;

Dp is the diameter of a pitch circle drawn by interconnecting the centers of the rolling elements 28;

Dn is the diameter of each of the rolling elements 28; and

Z is the number of rolling elements 28.

Figure 7:
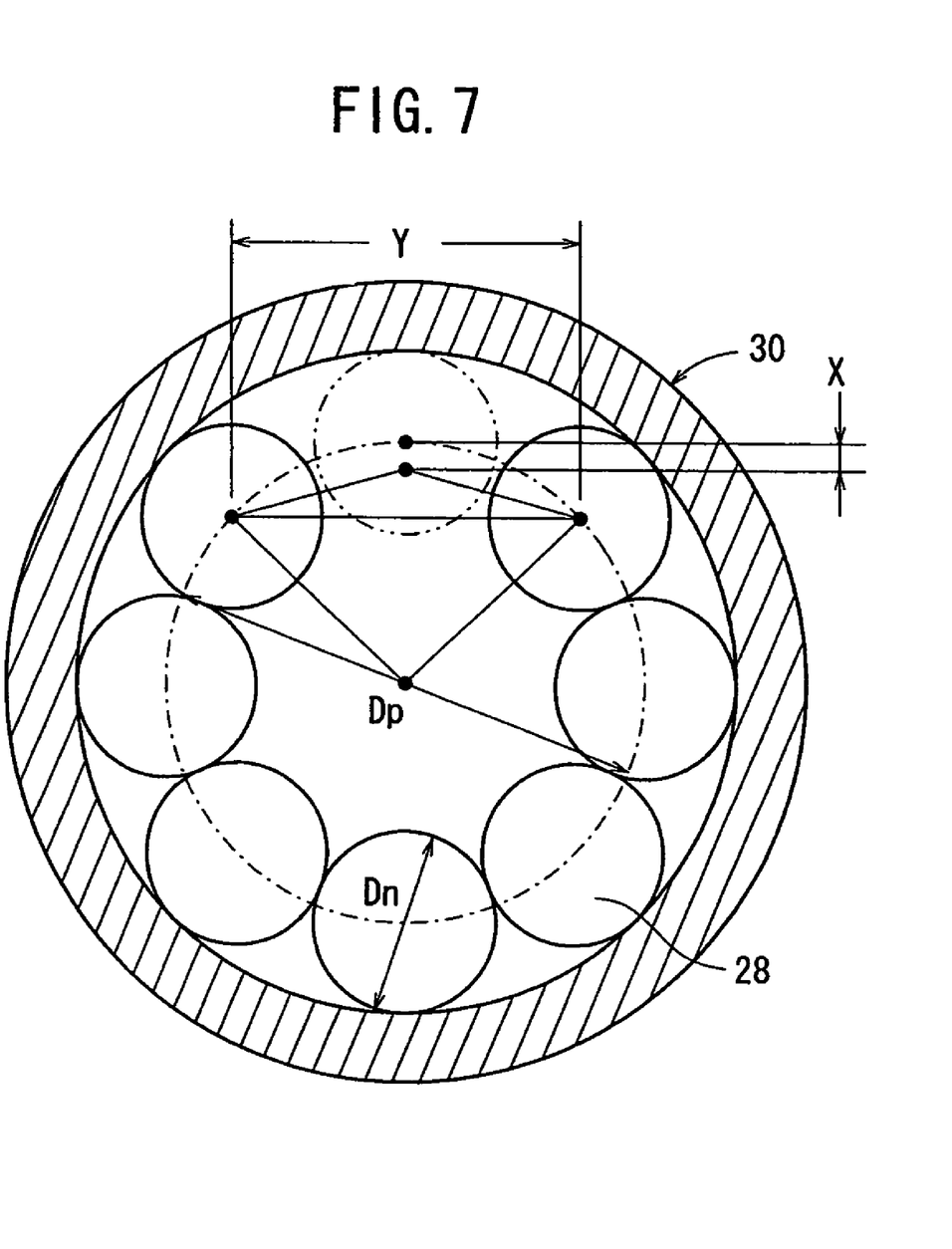
FIG. 7 is a cross-sectional view, which is illustrative of a distance X by which a rolling element moves radially.

When all the rolling elements 28 are arranged as a gap-free array along the inner circumferential wall surface 40 of the roller 30, as shown in FIG. 7, the distance Y between the centers of the rolling elements 28, which are positioned adjacent to the final rolling element 28 that is pressed in, is expressed according to the following equation (2).

$$Y = Dp \cdot \sin\{(Z-2)\sin^{-1}(Dn/Dp)\} \quad (2)$$

Therefore, the distance X by which the rolling element 28 is allowed to move radially of the roller 30 by the circumferential gap δ is expressed by the following equation (3).

$$X = \tfrac{1}{2}\{Dp - [\sqrt{(4Dp^2 - Y^2)} + \sqrt{(Dp^2 - Y^2)}]\} \quad (3)$$

Figure 5:
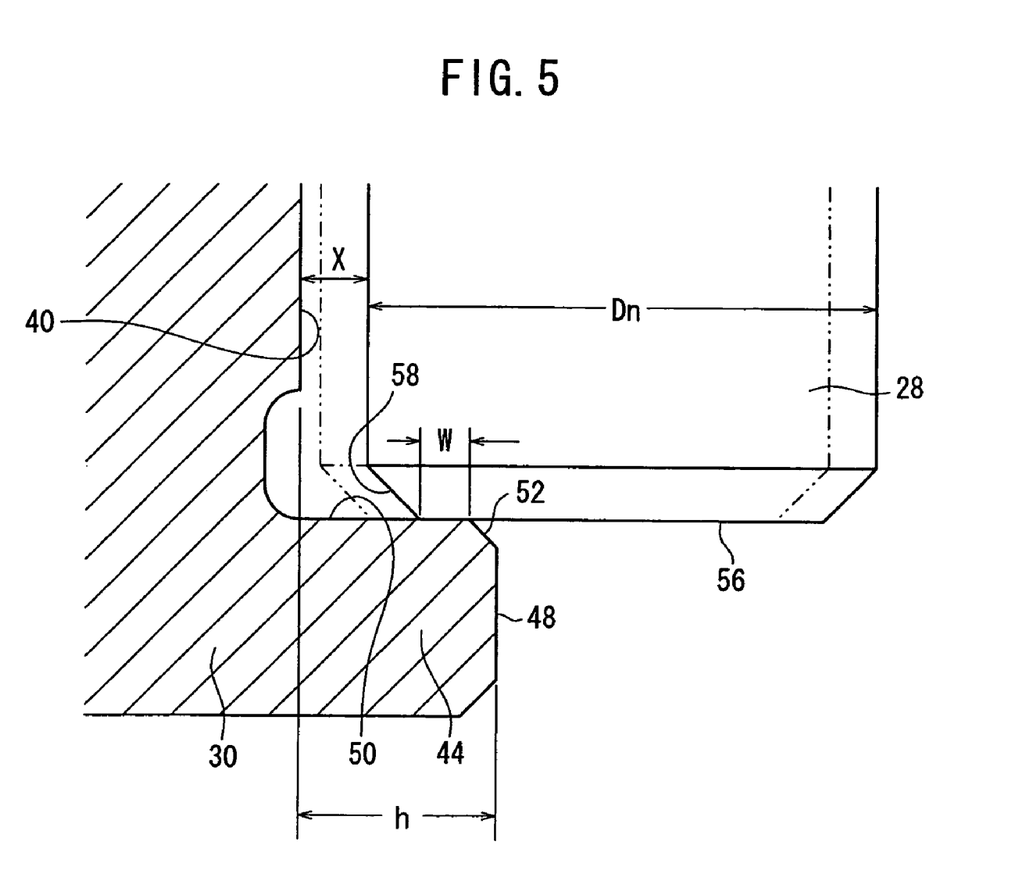
FIG. 5 is a fragmentary cross-sectional view showing a distance, as viewed circumferentially, by which the rolling element, assembled by the keystone process according to the embodiment of the present invention, moves radially.

According to the present embodiment, if the distance X is maximum, then the first flange 42 (or the second flange 44) is set at a height h such that the ratio (W/Dn) of the width W of contact to the diameter Dn of the rolling element 28 is in a range of from 0% to 30%. As shown in FIG. 5, the width W of contact refers to a horizontal width of contact between the inner side surface 50 of the second flange 44 (or the first flange 42) of the roller 30 and the flat end face 56 of each of the rolling elements 28.

According to the present invention, when the ratio (W/Dn) of the width W of contact to the diameter Dn of the rolling element 28 is set in a range of from 0% to 30%, the depth of a groove for holding the rolling elements 28 which is defined between the first and second flanges 42, 44 of the roller 30 is reduced, thus allowing the first and second flanges 42, 44 to be machined with ease and also allowing the rolling element 28 to be assembled with ease, while reducing resistance to rotation of the rolling elements 28. Furthermore, the contact pressure between the rolling elements 28 and the inner wall surface of the roller 30 is lowered thereby to increase the durability of the rolling elements 28 and the roller 30.

Figure 9:
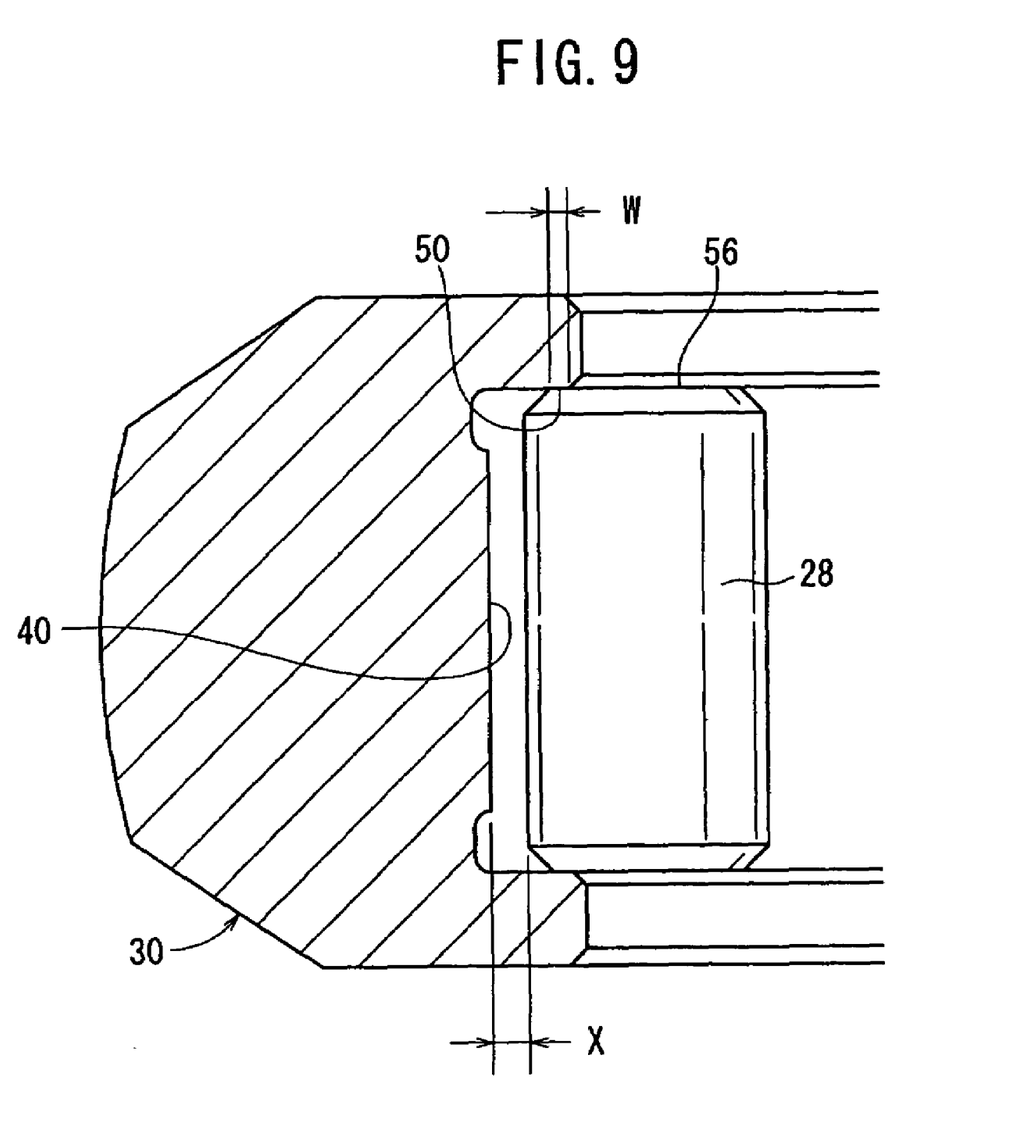
FIG. 9 is an enlarged fragmentary cross-sectional view showing the width W of contact and the distance X by which the rolling element moves radially.

The distance X by which the rolling element 28 moves radially of the roller 30 based on the circumferential gap δ represents a maximum distance by which the rolling element 28 moves radially (see FIGS. 5 and 9). While maintaining the width X of contact and the maximum distance X that the rolling element 28 moves, a suitable value for the height h of the first flange 42 and the second flange 44 can be achieved.

Figure 8:
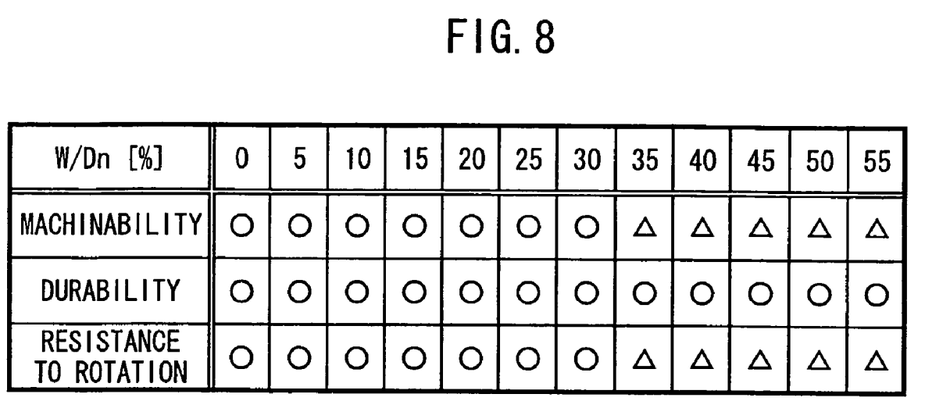
FIG. 8 is a table showing whether various characteristics are acceptable or not, when the ratio (W/Dn) of the width W of contact between a flange and a rolling element to the diameter Dn of the rolling element varies.

In FIG. 8, the mark "○" indicates that the performance characteristics were acceptable, and the mark "Δ" indicates that the performance characteristics were not acceptable. The results shown in FIG. 8 were determined by way of experimentation and simulation.

Although a certain preferred embodiment of the present invention has been shown and described in detail, it should be understood that various changes and modifications may be made therein without departing from the scope of the invention as set forth in the appended claims.

What is claimed is:

1. A tripod constant-velocity universal joint comprising:

an outer housing including a plurality of guide grooves defined in an inner circumferential surface thereof;

a spider inserted in said outer housing, the spider including three trunnions projecting radially outwardly from said spider; and a plurality of rollers, wherein each roller includes a plurality of rolling elements and is rotatably mounted on a corresponding trunnion, said rollers being rotatably and slidably provided against guide surfaces of said guide grooves, wherein said rolling elements have flat surfaces on end faces thereof and one of said rolling elements is radially movable and all remaining rolling elements are assembled on and are held in contact with inner circumferential surfaces of said rollers, each of said rollers having flanges disposed on respective ends thereof, and wherein when the radially movable rolling element moves between zero to a maximum offset in a radial direction represented by a distance X, a ratio W/Dn is maintained in a range of 0% to 30%, wherein W is a contact surface between said flat surface of said rolling side surface and said inner side surface of said flanges, and Dn is a diameter of said flanges.

2. The tripod constant-velocity universal joint according to claim 1, wherein a distance Y between the centers of two rolling elements positioned adjacent to the radially movable rolling element that is pressed in when all the remaining rolling elements are arranged as a gap-free array along each of the inner circumferential surfaces of said rollers, and said distance X by which the radially movable rolling element moves are represented by the following equations:

$$Y = Dp \cdot \sin\{(Z-2)\sin^{-1}(Dn/Dp)\},$$

and $$X = \tfrac{1}{2}\{Dp - [(4Dp^2 - Y^2)^{1/2} + (Dp^2 - Y^2)^{1/2}]\},$$

wherein

Dp is the diameter of a pitch circle drawn by interconnecting the centers of the rolling elements;

Dn is the diameter of each of the rolling elements; and

Z is the number of rolling elements.

3. The tripod constant-velocity universal joint according to claim 1, wherein a circumferential gap δ defined between adjacent rolling elements while the remaining rolling elements are held in contact against the inner circumferential surface of said roller is represented by the following equation:

$$\delta = Dp \cdot \sin\{(Z-1)\sin^{-1}(Dn/Dp)\} - Dn$$

wherein

Dp is the diameter of a pitch circle drawn by interconnecting the centers of the rolling elements;

Dn is the diameter of each of the rolling elements; and

Z is the number of rolling elements.

4. The tripod constant-velocity universal joint according to claim 1, wherein the flanges of the rollers include a beveled edge defined on at least one corner thereof.

5. The tripod constant-velocity universal joint according to claim 1, wherein the rolling elements include a beveled edge defined on at least one corner thereof.

6. The tripod constant-velocity universal joint according to claim 1, wherein each roller includes an annular groove defined along an inner surface thereof.

* * * * *